United States Patent [19]

Stolzer

[11] Patent Number: 5,536,129
[45] Date of Patent: Jul. 16, 1996

[54] APPARATUS FOR TRANSFERRING LONG STOCK BETWEEN POSITIONS ASSOCIATED WITH STORAGE AND PROCESSING STATIONS

[75] Inventor: Armin Stolzer, Baden-Baden, Germany

[73] Assignee: KEURO Besitz GmbH & Co. EDV-Dienstleistungs KG, Achern, Germany

[21] Appl. No.: 288,560

[22] Filed: Aug. 10, 1994

[30] Foreign Application Priority Data

Oct. 16, 1993 [DE] Germany ............... 43 35 334.7

[51] Int. Cl.$^6$ .............. B65G 65/02; B65G 1/04; B66F 9/07
[52] U.S. Cl. .............. 414/278; 414/917; 414/276; 414/745.7
[58] Field of Search ............ 414/276, 917, 414/745.7, 746.8, 745.1, 630, 662, 267, 277, 278, 22.61, 22.62; 211/70.4, 60.1

[56] References Cited

U.S. PATENT DOCUMENTS

| | | | |
|---|---|---|---|
| 2,398,949 | 4/1946 | McClain | 414/917 |
| 4,252,486 | 2/1981 | Soligno | 414/276 |
| 4,372,724 | 2/1993 | Stolzer | 414/281 |
| 4,488,847 | 12/1984 | Stolzer | 414/222 |
| 4,491,449 | 1/1985 | Hawkins | 414/746.8 X |
| 4,708,566 | 11/1987 | Stolzer et al. | 414/276 |
| 4,778,325 | 10/1988 | Stolzer et al. | 414/276 |
| 4,815,922 | 3/1989 | Midorikawa | 416/276 |
| 4,881,634 | 11/1989 | Stolzer | 414/276 X |
| 5,354,169 | 10/1994 | Washio et al. | 414/745.7 |

FOREIGN PATENT DOCUMENTS 261543  11/1988  Germany ............... 414/276

Primary Examiner—Karen B. Merritt
Assistant Examiner—Stephen Gordon
Attorney, Agent, or Firm—Frishauf, Holtz, Goodman, Langer & Chick

[57] ABSTRACT

An apparatus for transferring long stock (3) from or to either of two storage racks (1) arranged in parallel to each other, to a processing station, such as a saw. The apparatus is located in an aisle (4) between the storage racks and has a pair of arms (18, 19, 20, 20a) arranged in a parallel linkage system. The arms are journalled on the apparatus for simultaneous pivotal movement. The free end of each pair of arms has a conveyor (9, 10) mounted thereon to extend in parallel and adjacent to the storage racks (1) between upper and lower positions which for each conveyor are substantially identical. A hoist is provided for loading long stock onto, and remove it from, either conveyor (9, 10) in its upper position. In the lower position either conveyor (9, 10) is aligned with a processing station.

17 Claims, 8 Drawing Sheets

APPARATUS FOR TRANSFERRING LONG STOCK BETWEEN POSITIONS ASSOCIATED WITH STORAGE AND PROCESSING STATIONS

Reference to related patents the disclosures of which are incorporated herein by reference:

U.S. Pat. No. 4,372,724—Stolzer, issued Feb. 8, 1983;
U.S. Pat. No. 4,488,847—Stolzer, issued Dec. 18, 1984;
U.S. Pat. No. 4,881,634—Stolzer, issued Nov. 21, 1989.

FIELD OF THE INVENTION

The invention in general relates to the handling of long stock such as rails, strips, logs, beams and the like, or any kind of container filled with such long stock. More particularly, the invention relates to apparatus for transferring such long stock between by alternatingly moving a support between positions associated with a processing station machine and a storage facility. The processing station may be a sawing machine such as a cold circular saw or a band saw and the support may be a conveyor system adapted to feeding such elongate stock in a precisely defined orientation relative to the processing station.

BACKGROUND

The transfer apparatus may be an intermediate stage between storage facilities and a processing machine or, as in the case of containers or cassettes filled with long stock, a station for individually unloading pieces of long stock before they are moved to a processing machine.

While the following description of the invention will be restricted to describing its application in connection with a sawing machines, it will be understood that such restriction is not intended thus to limit the possible uses of the invention, but that the invention may be practiced with no less efficiency and effect with any kind of processing machine to which long stock is fed by a conveyor. "Long stock" as used herein is intended to be any article having one dimension which exceeds its other two dimensions.

The conveyor referred to above typically is a roller track and serves to feed long stock to the cutting machine for processing therein and for removing the stock from the cutting machine after a processing. The defined orientation of the stock on the track may be attained by an appropriate symmetrical configuration of the roller track, such as, for instance, a V-shaped configuration, and by adapting the lay-out of the cutting machine to given operating conditions.

A crane or hoist having a load beam provided with laterally protruding booms or tines or the like is used to place bar-shaped workpieces on the roller tracks. By means thereof, long stock is transferred from a storage facility to the roller track, and unused or left-over material is transferred from the roller track to the storage facility. In a known arrangement, the roller track or at least that portion of it which is located immediately adjacent the cutting machine is for this reason arranged substantially parallel to the long stock in the storage facility so that the stock in being transferred from its storage position to onto the roller track needs only to be moved vertically and horizontally.

In the context of the present invention the storage facility is composed of cages or shelves arranged in storage racks aligned laterally of the longitudinal dimension of the long stock. For the purpose of transferring long stock to and from the shelves, the hoist may be moved towards them across the aisle between the storage racks.

To avoid lost time in the operation of the hoist and an inefficient use of the main operating time of the cutting machine, a transfer apparatus is provided which is similar to the one disclosed by U.S. Pat. No. 4,881,634—Stolzer, issued Nov. 21, 1989, and incorporated by reference herein. In the known apparatus material next in line to be processed may be kept in a state of abeyance or readiness, once processing of a preceding lot has been completed, to allow removal of the previously processed material and its replacement by the material next to be processed, before returning possible remainders of the processed material to the storage facility. The processing time of a given lot allows for sufficient time for the hoist to move remainders of previously processed material to a storage facility and to bring by material next to be processed.

In the prior art apparatus, movement of the hoist and its load beam, of any materials transfer means, as well as of the roller track, is automatically controlled numerically to the extent possible by the lay-out of the storage facility, the positioning or orientation and kind of long stock, etc. Since these aspects are well known to persons skilled in the art of materials handling, they will not be explained in detail again. Persons skilled in the art will, however, appreciate, that those aspects or principles are equally applicable to the present invention. Therefore, in explaining the invention, general knowledge will be assumed of the fact that the operation of the apparatus is controlled automatically and that, therefore, a detailed description of the controls per se may be dispensed with.

The known apparatus utilizes a roller track mounted on a support frame and guide ways or tracks continuing laterally upwardly from the fame. Support elements for the long stock may be moved along the tracks. The upper position which may thus be reached by the support elements serves to load or retrieve long stock by the hoist. The lower position corresponds to a transfer position between long stock and roller track. The operating sequence is such that one of the support elements supporting the lot next in line to be processed has moved downwardly so that the stock may be placed on the roller track preparatory to a processing operation, whereas the other support element and the processed stock thereon have moved to the upper position where the hoist may take over the processed stock. Following the depositing of the processed stock in the storage facility the hoist will return carrying with it stock to be processed next and place it into the retainer located in the upper position.

While such handling apparatus has proven to be satisfactory, it can still be improved. The V-shaped upwardly flaring guide tracks of the two support elements require relatively large space transversely of the long stock, particularly in view of the fact that in the region of the upper position of the support elements, the hoist requires some space for its movements. The two upper positions of the support elements are spaced relatively far from each other, so that for removing stock to be returned to storage and for depositing stock next to be processed, the hoist must be moved to different positions.

Each of the support elements, as well as the separate guide tracks in the known apparatus, have to be separately moved and controlled. This requires undue complexity in terms of controls and materials. For moving between their upper and lower positions each of the support elements requires its own lifting drive, and each of these requires its own controls. As has been stated above, each of the support elements requires its own guide track, which needs to be assembled and mounted on the support frame.

The known support elements are made of forks made up of prongs arranged consecutively in the direction of the longitudinal dimension of the long stock. The prongs need to be arranged so they may intermesh without colliding with the loading means of the hoist on the one hand, and with the spacing of the rollers of the roller track, on the other. The added space thus required in the direction of the longitudinal extent of the stock prevents the rollers from being spaced closely together. Such close spacing would, however, be desirable, especially in that section of the roller track which is adjacent to the cutting machine. The section close to the cutting machine may have to take up short left-over pieces of the long stock. These, of course, could only be conveyed without tilting if the rollers are spaced sufficiently closely together. However, such close roller spacing cannot be achieved because of the limitations set by the spatial requirements of the prongs of the support elements.

The distance between the upper positions of the support elements disadvantageously affects the operating time of the hoist; for in order to deposit stock next to be processed on the support element on one side and thereafter to retrieve processed stock from the support element on the other side for return to storage, the hoist, as set forth above, has to travel to the different upper positions of the supports.

THE INVENTION

It is an object of the invention to provide a transfer apparatus of the kind referred to which requires less space than known apparatus, requires relatively few controls, maximizes operating time, and is capable of handling short pieces of long stock.

Briefly, the transfer apparatus in accordance with the invention comprises a stationary support frame extending substantially in the direction of the longitudinal dimension of the long stock. A parallel linkage guide means mounted on the frame for alternating pivotal movement in a plane intersecting the longitudinal dimension, as well as two bidirectionally drivable conveyors mounted on the guide means on opposite sides of the support frame. The parallel linkage guide means can move the roller tracks between vertically aligned upper and lower positions, in unison.

Advantageously, the parallel linkage comprises two parallel sets of two arms disposed parallel of each other adjacent opposite ends of the support frame of the apparatus and journalled in their longitudinal centers about two common parallel axes.

The restrictions inherent in prior art apparatus in respect of roller spacing and the length of conveyable material are avoided by the roller conveyor or tracks provided in the apparatus in accordance with the invention.

By pivotally mounting the roller tracks to the free ends of arms arranged as parallel linkages, separate guide tracks for the support elements are no longer necessary, since they may now be moved between upper and lower positions because of their common parallel linkages. This, in turn, leads to a reduction in the number of required drive means as the common parallel linkages permit the use of a single drive means. An advantage in terms of operating time is achieved by the two roller tracks being moved in unison.

If the displacement or pivot angles of the parallel linkages above and below a horizontal line are identical, the arms of the linkages may by journalled in their exact longitudinal center, otherwise they may be journalled slightly offset.

The transfer apparatus in accordance with the invention makes it possible to reduce the width of the aisle between storage racks and brings about a more efficient utilization of the hoist, while at the same time significantly reducing the complexity of the construction and its necessary operating controls.

Structural considerations led to affixing the roller tracks to the parallel linkages or guide arms by way of support arms, with the roller tracks being mounted at the upper ends of the support arms and the arms being connected to the parallel linkages at their lower end. This results in a sufficient vertical distance between the upper and lower positions. Another advantage is derived from inclining the upper portion of the upright arms in the direction of the support frame in order to provide substantially identical upper and lower positions of the roller tracks relative to the support frame. In this fashion, difficulties with respect to connecting to continuing tracks leading to the cutting machine. In respect of the upper position, the hoist will have to move to the same location, regardless of the side from which it is approaching the track. This aspect, too, results in simplified controls.

The structure in accordance with the invention makes it possible, furthermore, to use single drive means for simultaneously moving or pivoting both parallel linkages. Preferably, the drive means is a fluid-operated cylinder-piston unit.

Another advantage is derived from the fact that abutments or sensors are provided to define the terminal positions of the pivotal movements of the parallel linkage, thus simplifying the control of the operating sequence.

The defined position or orientation of the long stock on the roller tracks may be attained by abutments provided on the roller tracks. The abutments may, for instance, be rollers rotatable about a vertical axes. Furthermore, the surface of the roller tracks may be inclined toward the abutments.

DRAWINGS

DETAILED DESCRIPTION.

Figure 1:
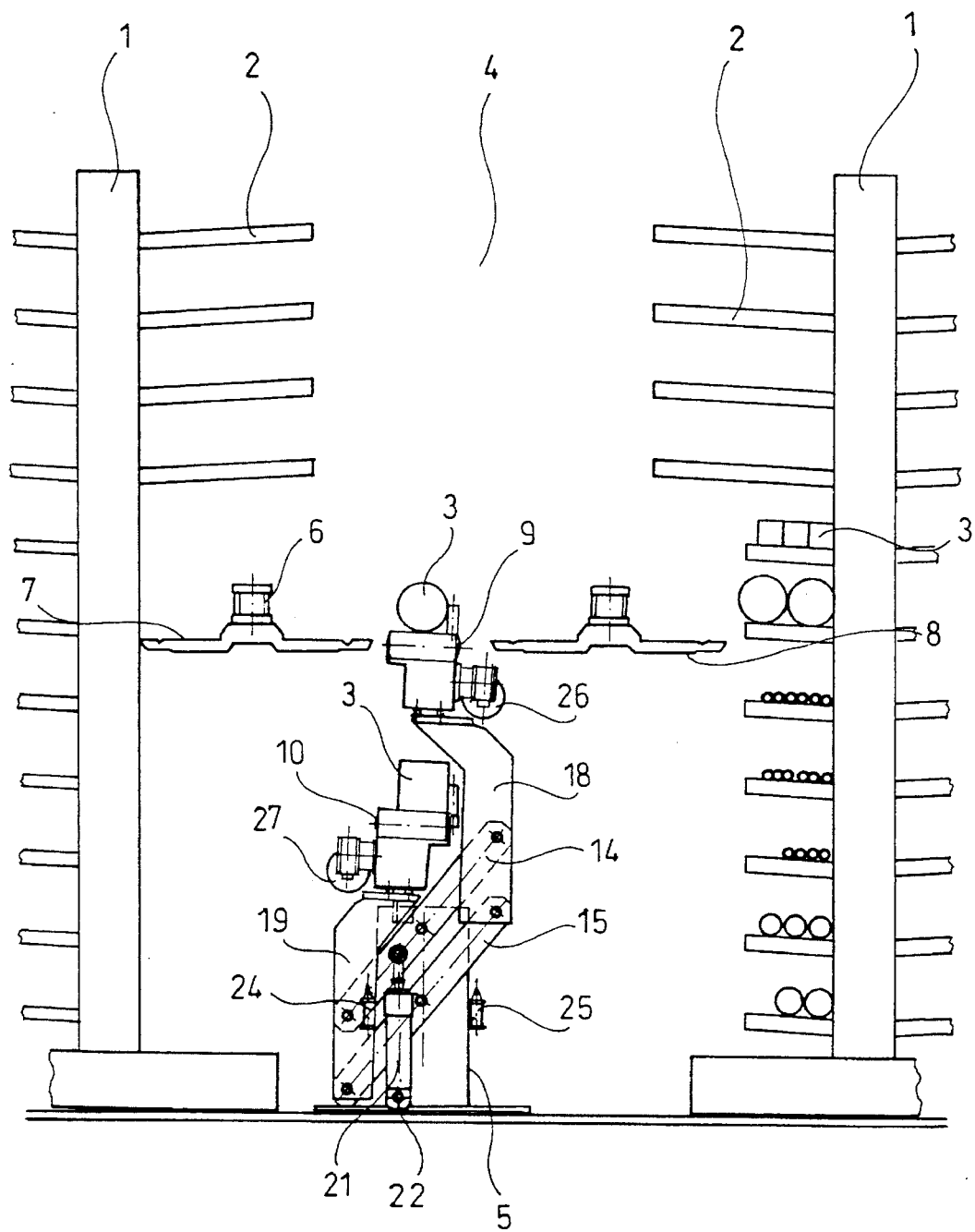
FIG. 1 is a schematic front elevational view of a transfer apparatus in accordance with the invention integrated in a storage facility.

FIG. 1 shows two storage racks 1 having storage shelves or compartments 2 protruding from both sides of the rack 1 to hold long stock 3. "Long stock", as used herein, is meant to connote articles one dimension of which substantially exceeds its other two dimensions, such as bars, rods, poles, logs, shafts, rails and the like; and containers, e.g. crates, cassettes or magazines containing one or more of such long stock items may be provided. Typically, each shelf or compartment 2 contains identically shaped articles although, depending upon the controls provided for the apparatus, such identity may not be necessary. Therefore, the storage shelves 2 may be of different heights.

An aisle 4 is provided between the storage racks 1. A support frame 5 of the apparatus for transferring long stock 3 is secured in aisle 4, as will be described in more detail hereinafter.

A load beam 6 is depicted in two different positions in FIG. 1. On its opposite sides the load beam 6 is provided with load receiving means which are here shown to be prongs or tines 7, 8. The tines 7, 8 are provided for withdrawing long stock 3 from given shelves or cages 2 and for transferring it to retainers or support elements shown as roller tracks or conveyors 9, 10. The conveyors 9, 10 are mounted on the support frame 5 for rolling movement transversely of the longitudinal dimension of the long stock 3, between upper and lower positions. The tines 7, 8 may also serve to remove material such as processed stock, remainders or waste from the roller tracks 9, 10.

The load beam 6 is mounted for vertical movement on a hoist (not shown) but well-known in the art of materials handling, and the hoist itself is movable between the storage racks 1, across the aisle 4, and transversely of the longitudinal dimension of the long stock 3.

Figure 3:
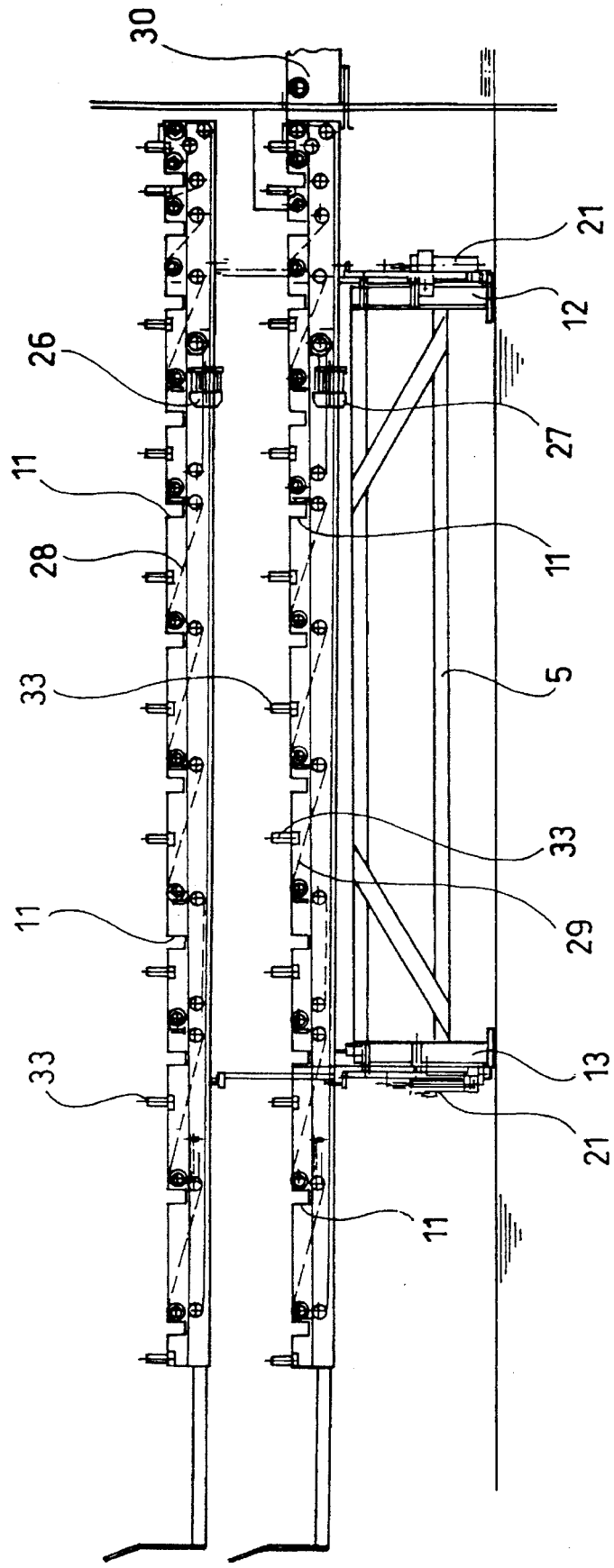
FIG. 3 is a schematic side elevation of the transfer apparatus in accordance with the invention, viewed from the right relative to FIG. 2.

As may be seen in FIG. 1, the roller tracks 9, 10 may be approached by the load beam 6 from either side, with the tines 7, 8 being insertable into the spaces between the rollers of the roller track 9, 10, by way of notches 11 shown in FIG. 3.

Figure 2:
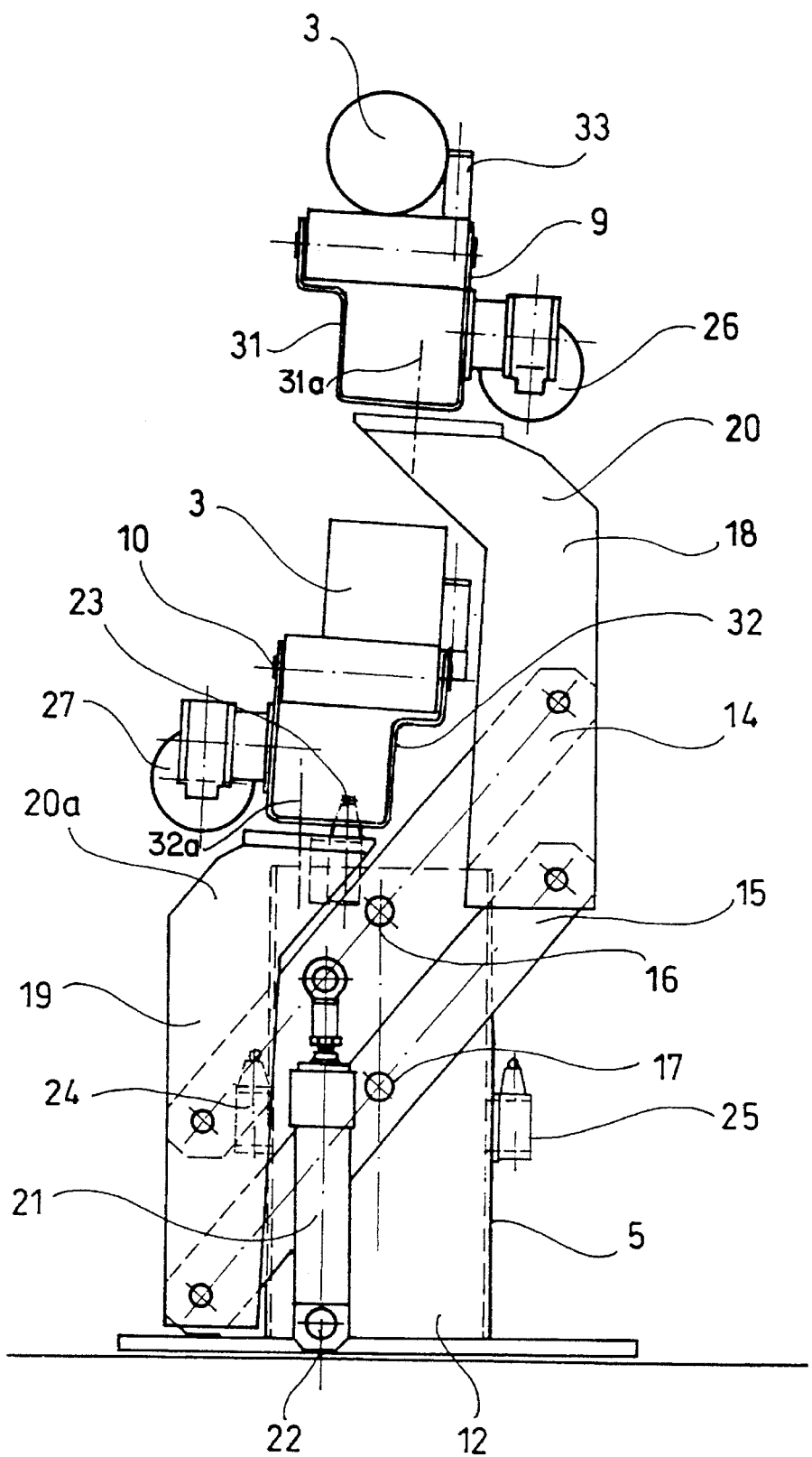
FIG. 2 is an enlarged schematic front elevational view of the transfer apparatus of FIG. 1.

FIGS. 2 and 3 are illustrations on an enlarged scale and in more detail of the apparatus for transferring long stock.

The support frame 5 is seen to extend substantially parallel to the longitudinal dimension of the long stock 3 and to be provided with a front wall 12 as well as a rear wall 13 extending normal to the longitudinal dimension of the stock.

Pairs of parallel guide arms 14, 15 are pivotally mounted at 16 and 17, preferably precisely at their longitudinal center, on the walls 12, 13. An upright lifting arm 18, 19 is pivotally connected to the free end of each of the guide arms 14, 15. The arrangement of the rotatable connections of the two arms 14, 15, with the lifting arms 18, 19 on the one side and with the support frame at 16, 17 at the other will be recognized as a parallel linkage, also know as a four-bar-linkage. At their upper end sections, as seen in FIG. 2, the lifting arms 18, 19 are supporting the roller tracks 9,10. The upper end sections 20, 20a of the lifting arms 18, 19 are inclined in the direction of the support frame 5 so that the upper and lower positions of the two roller tracks 9, 10 are substantially identical.

The guide arms 14, 15 may be subjected to pivotal movement by a fluid operated cylinder-piston-unit 21 one opposite ends of which is pivotally connected to one of the arms 14, 15 and the other to a pivot 22 on support frame 5, respectively. Instead of a fluid operated cylinder-piston unit, other drives such as linear motors may be used to pivot the arms 14, 15.

For limiting the extent of the transfer movement of the two roller tracks 9, 10 between their upper and lower positions, abutments or sensors 23, 24, 25 are provided which cooperate with one of the roller tracks 9, 10 or one of the arms 14, 15.

As indicated in FIG. 3, an arrangement substantially similar to that of the arms 14, 15 described above is provided at the end of the support frame 5 opposite the end shown in FIG. 2, but because of its similarity is not shown in detail and will not be described again.

As may be seen in FIGS. 2 and 3, both roller tracks 9, 10 are provided with a drive 26, 27 which may impart bidirectional motion to the rollers by means of chains 28, 29.

Referring to FIG. 3, it will be seen that the spacing between the rollers is reduced in both roller tracks 9, 10 in their end sections abutting a continuing track 30 leading to a cutting machine, for instance. Because of the close spacing between them, the rollers may support even short pieces of stock, such as remainders and left-overs, without any danger of jamming as a result of such pieces tilting between the rollers. Therefore, the spacing between the notches 11 for receiving the prongs of the shelf loading apparatus is also reduced. Obviously, the load beam 6 at this location is also provided with tines 7, 8 of reduced spacing.

It should be noted that the roller tracks 9, 10 are provided with self-supporting holding structures or brackets 31, 32 (FIG. 2) which rotatably support return wheels or sprockets for the roller drive chains 28, 29.

Figure 4:
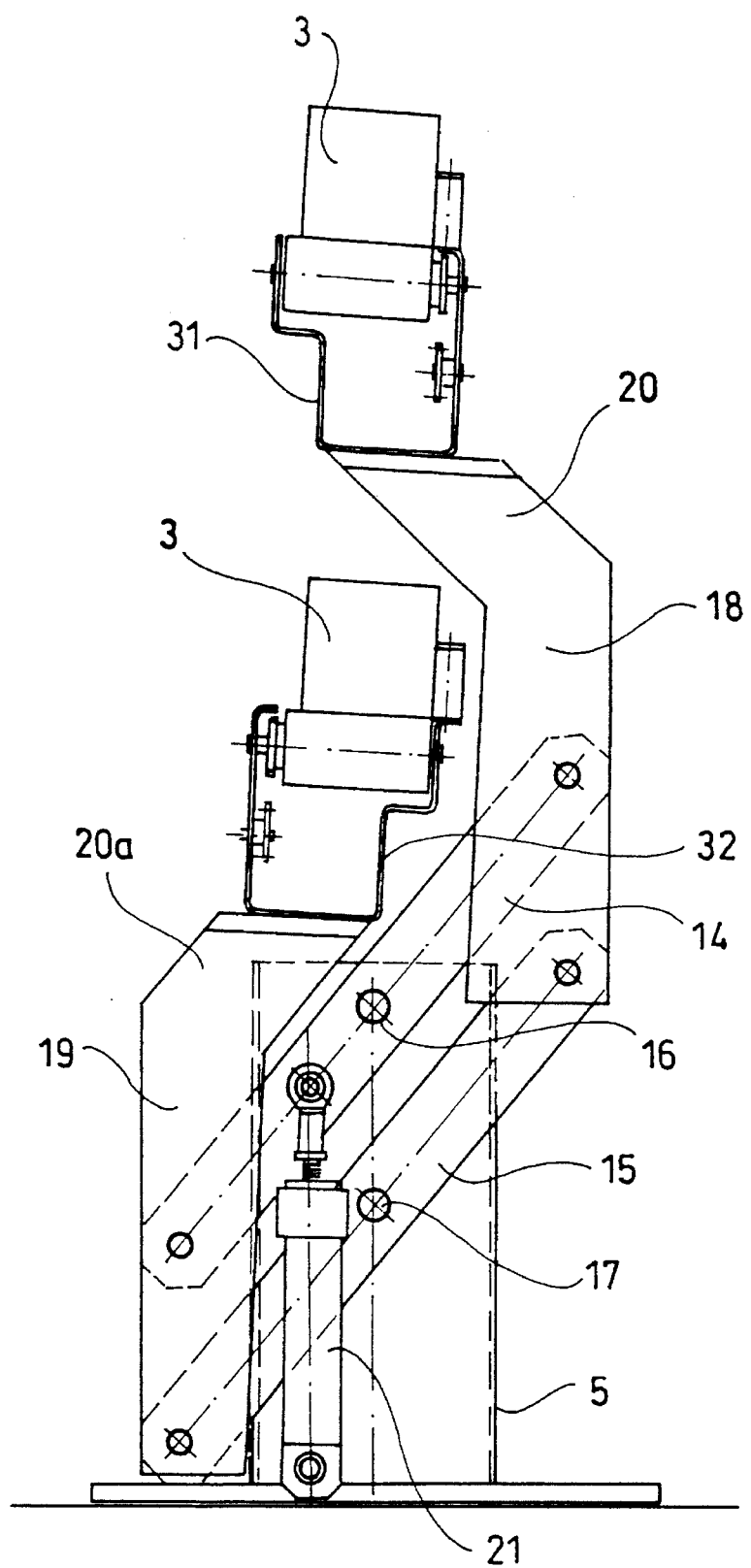
FIG. 4 is a view similar to FIG. 2 of an alternate apparatus.

In the embodiment shown in FIG. 2 the brackets 31, 32 of the roller tracks are connected by screws, shown schematically at 31a, 32a in the drawing for clarity, to the inclined sections 20, 20a of the lifting arms 18, 19. By contrast, in the embodiment of FIG. 4, similar brackets are directly connected to the inclined sections, as by welding, for instance.

Operation

With the described apparatus the hoist 6 may transfer long stock 3 at a given upper position within the aisle 4 to one of the roller tracks 9, 10. Stop rollers 33 (FIGS. 2, 3), rotatable about a vertical axis, prevent stock 3 from rolling off the roller tracks 9, 10, and define the position of long stock placed on the respective roller track 9 or 10. The roller tracks 9, 10 are slightly inclined towards the stop rollers 33. In subsequent operations the roller tracks 9, 10 are alternatingly moved between their upper and lower positions by the fluid-operated cylinder-piston unit 21, i.e. at the same time as one of the roller tracks is moving from its upper position to its lower position, the other roller track is moving in the opposite direction. The roller track moved to the lower position will align the stock it is carrying relative to the processing machine for processing therein. The other roller track which has moved to its upper position will first be cleared of any returned material and thereafter it will be loaded with long stock next to be processed.

Figure 5:
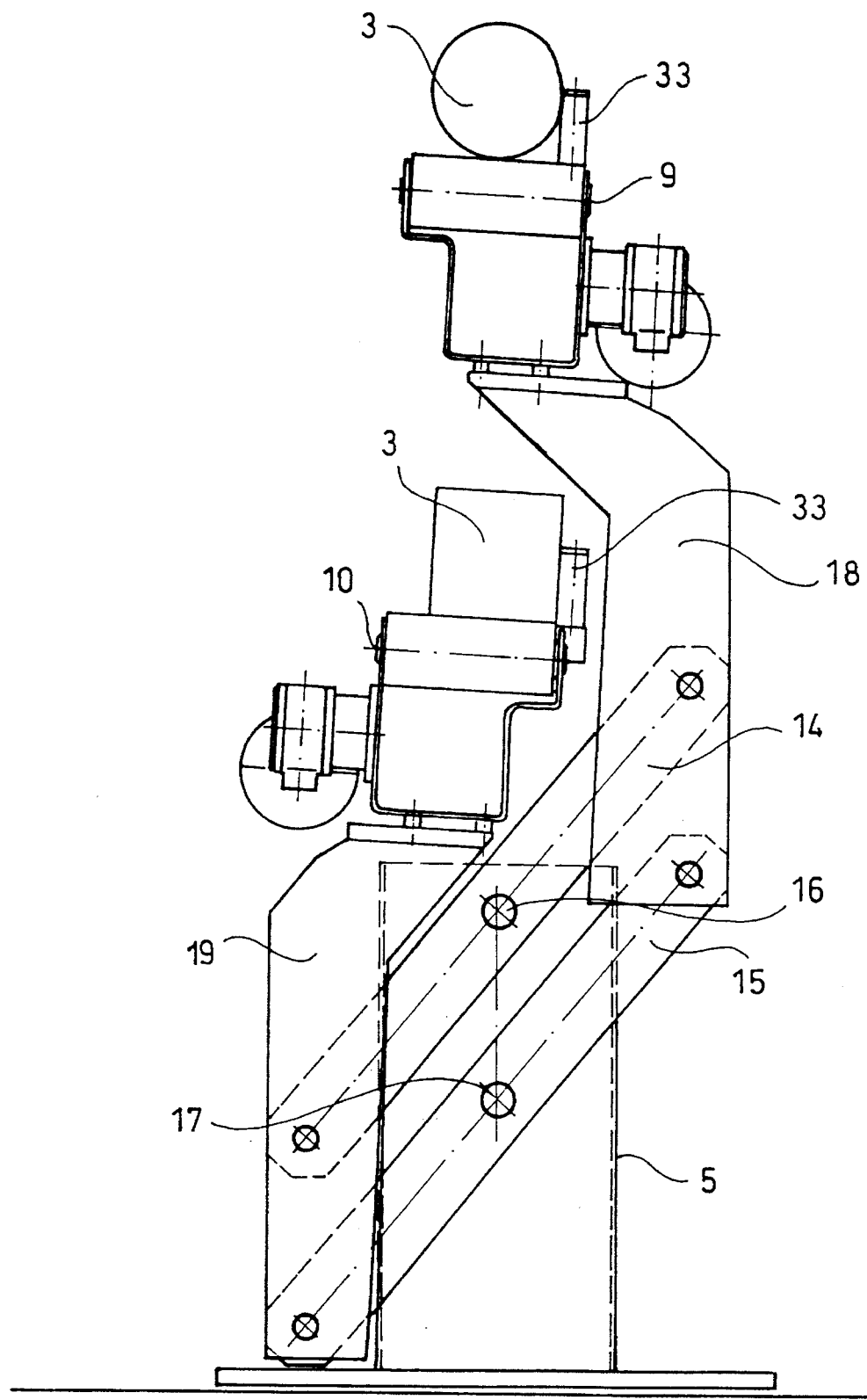
FIGS. 5–8 depict various stages of an operating cycle of the apparatus of FIG. 1–3.
Figure 6:
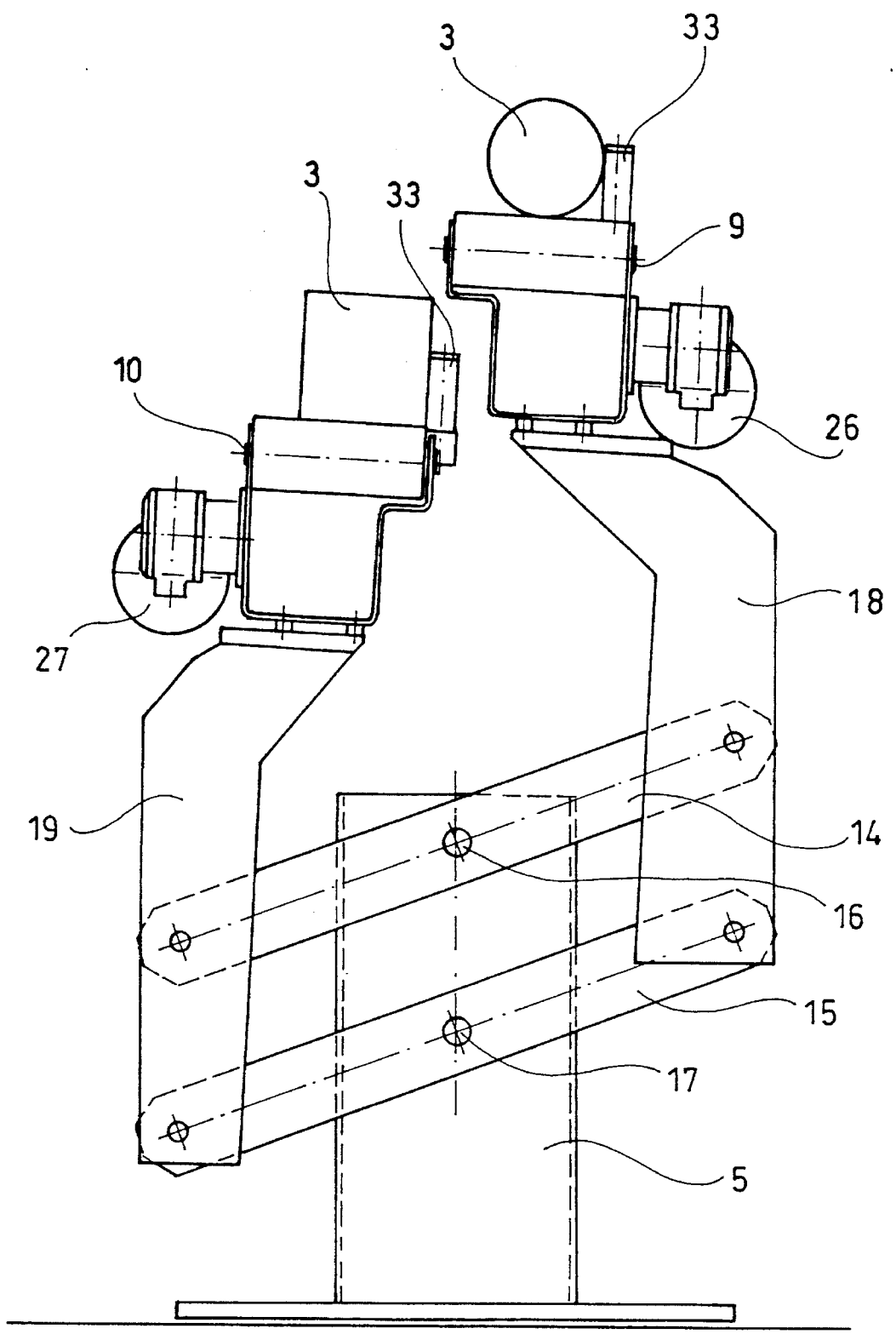
Figure 7:
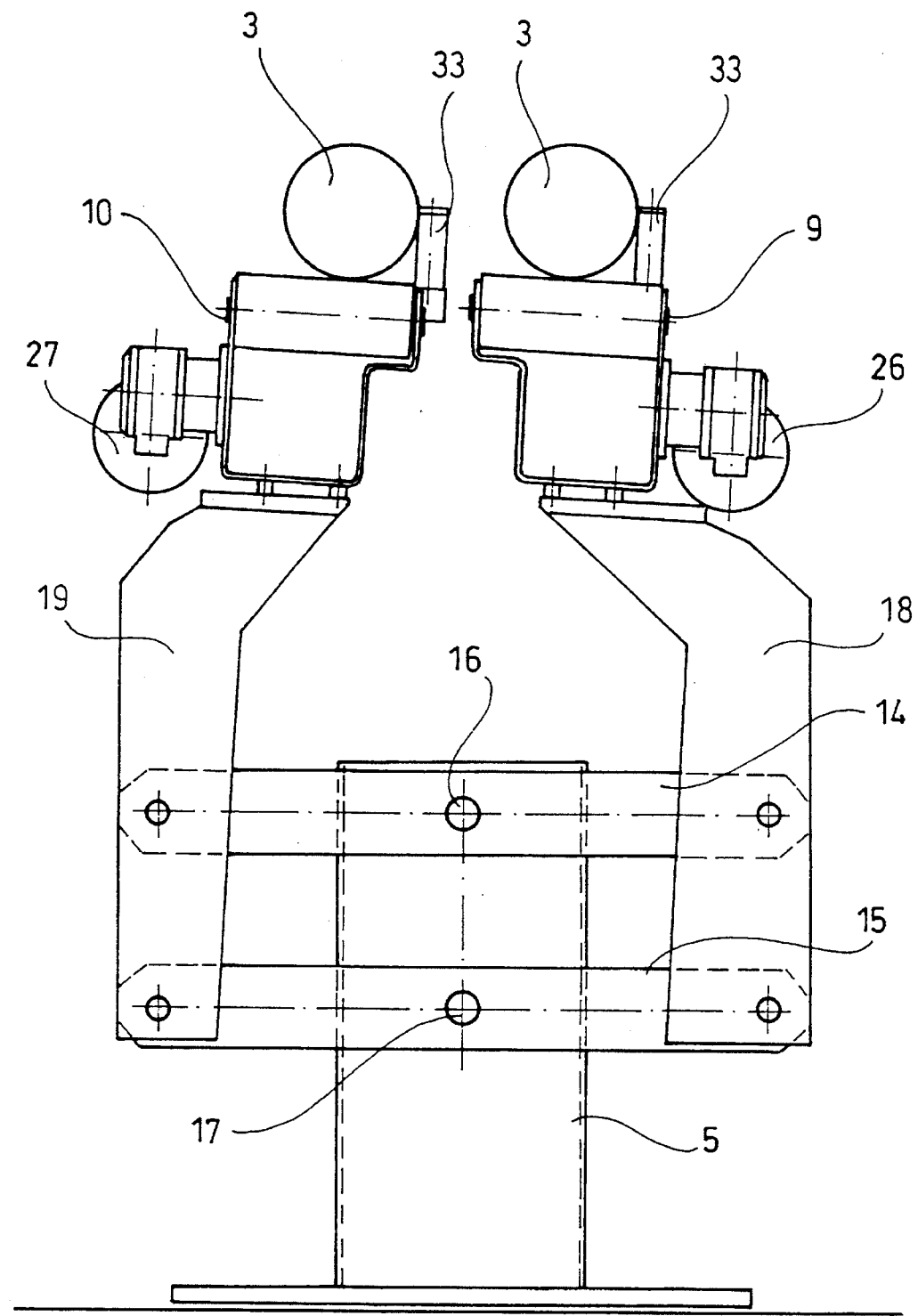
Figure 8:
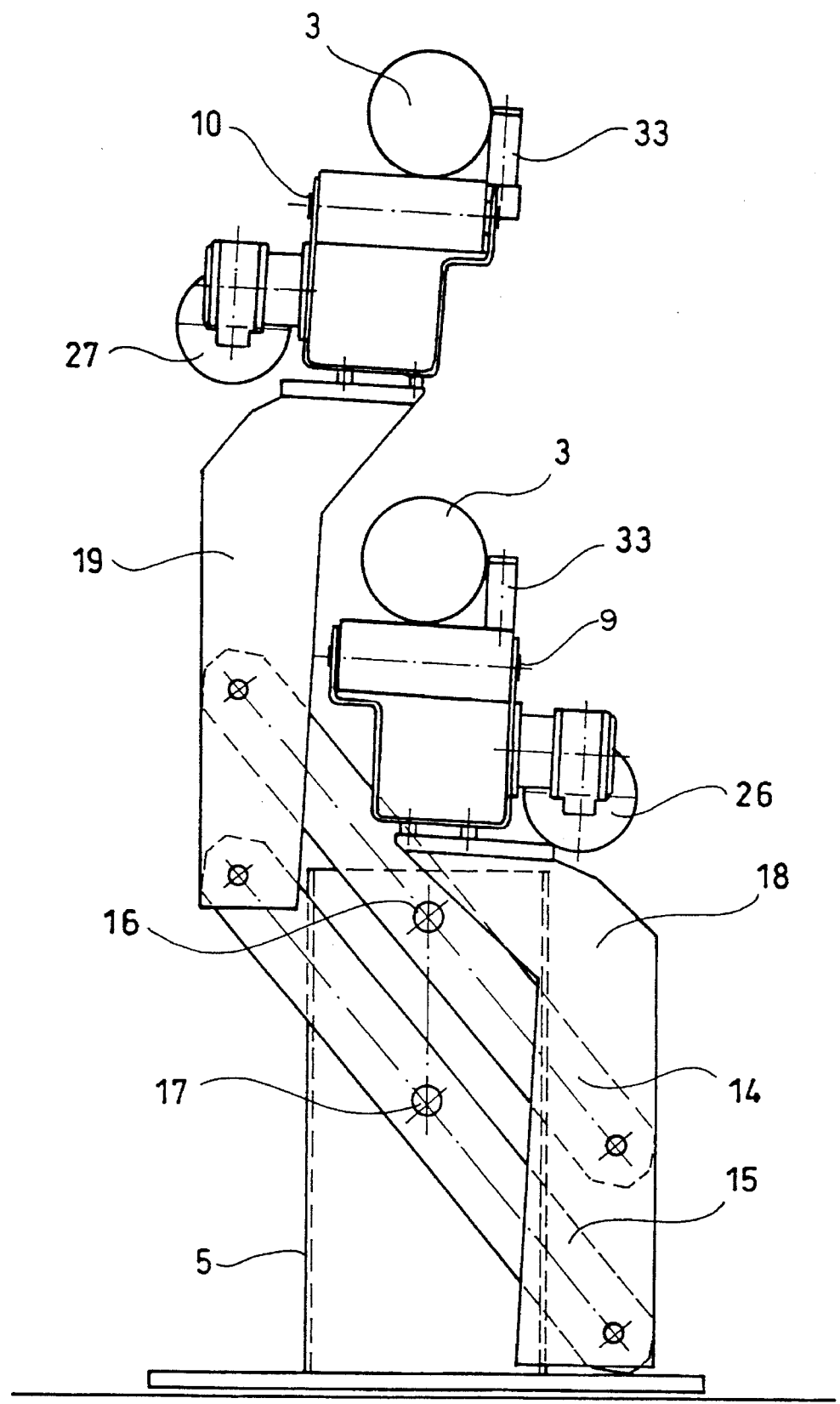

The alternating operation is explained in FIGS. 5–8. Using the same reference numerals used so far, the simultaneous change between the upper and lower positions of the roller tracks 9, 10 by the common drive means 21 will be explained. The parallel or four-bar-linkage guidance provided by the guide arms 14, 15 will maintain the lifting arms 18, 19 in their vertical disposition. Consequently, the roller tracks 9, 10 rigidly mounted in a horizontal orientation on the upper inclined portions 20, 20a of the lifting arms 18, 19 will not only maintain their own horizontal orientation during movement between their upper and lower positions, but they will also maintain the stock 3 borne by it, whether it was received from storage 2 or from processing, in the disposition in which it was placed on them, compare FIGS. 5, showing roller track 9 uppermost, with FIG. 6, a first intermediate position, FIG. 7, a parallel position, and FIG. 8, with roller track 10 uppermost.

Various changes and modifications may be made within the inventive concept.

I claim:

1. An apparatus for transferring long stock (3) between first and second positions adapted for association with storage means (1) and a processing station, respectively, comprising:

a stationary support frame means (5) extending substantially in the direction of the longitudinal dimension of said long stock (3), and having at least two support means (9, 10, 31, 32) for the stock (3) which can be selectively positioned between an upper and a lower location, each said support means (9, 10, 31, 32) including first and second bidirectionally drivable roller tracks (9, 10) extending substantially in the direction of the longitudinal dimension of said long stock (3);

parallel linkage guide means (14, 15) journalled on said frame means and supporting respective ones of said support means at the ends of said parallel linkage guide means (14, 15) for alternate pivotal movement of said respective ones of said support means around each other upon shifting of said parallel linkage guide means between respective upper and lower positions, which positions are essentially in perpendicular alignment; and mounting means (18, 19, 20, 20a) for mounting said respective ones of said support means (9, 10, 31, 32) on said parallel linkage guide means (14, 15) for alternate movement of the respective support means (9, 31; 10, 32) into, respectively, said upper and lower positions.

2. The apparatus of claim 1, wherein said parallel linkage guide means comprises first and second pairs of arms (14, 15) aligned in parallel on said frame means (5) at spaced locations thereof, the arms (14, 15) of each of said pairs being disposed in parallel relationship and journaled on said frame means (5) substantially in their longitudinal centers (16, 17) on one of two vertically spaced axes, respectively; and wherein said roller tracks (9, 10) are rotatably connected to respective free ends of said arms (14, 15).

3. The apparatus of claim 2, wherein said mounting means comprises a pair of vertically oriented arm members (18, 19), each said arm member having a lower section rotatably connecting said free ends of a respective one of said arms (14, 15) and an upper section rigidly connected to a respective one of said roller tracks (9, 10).

4. The apparatus of claim 3, wherein said upper sections (20, 20a) are inclined with respect to a vertical plane towards said frame means (5), whereby said first and second positions are substantially in varying regardless of whether occupied by said first or second roller track (9, 10).

5. The apparatus of claim 4, wherein each said roller track includes bracket means (31, 32) affixed to each said inclined section (20, 20a).

6. The apparatus of claim 5, wherein each said bracket means (31, 32) is threadedly affixed to each said inclined section (20, 20a).

7. The apparatus of claim 5, wherein, each said bracket means (31, 32) is affixed to each said inclined section (20, 20a) by welding.

8. The apparatus of claim 5, wherein linearly acting drive means (21) for pivotally moving said arms (14, 15) is provided, connected to one of the arms of at least one of the pairs thereof and to said frame means (5).

9. The apparatus of claim 8, wherein said linearly acting drive means comprises a fluid operated cylinder-piston unit (21).

10. The apparatus of claim 8, further comprising means (23, 24, 25) mounted on said frame means (5) for defining the limits of pivotal movement of said pairs of arms (14, 15).

11. The apparatus of claim 10, wherein said limit defining means (23, 24, 25) comprises sensors cooperating with motion control means of said apparatus.

12. The apparatus of claim 10, wherein said limits of pivotal movement of said pairs of arms (14, 15) coincide with said upper and lower positions of said support means (9, 10).

13. The apparatus of claim 1, wherein said roller tracks (9, 10) comprise means (33) for defining a position for long stock (3) placed on a respective roller track (9, 10).

14. The apparatus of claim 13, wherein said position defining means comprises roller means (33) rotatable about a vertically disposed axis.

15. The apparatus of claim 13, wherein said respective roller tracks (9, 10) are inclined with respect to said position defining means (33).

16. The apparatus of claim 1, wherein each said roller track (9, 10) comprises a plurality of rollers drivably connected to a respective drive means (26, 27, 28, 29).

17. The apparatus of claim 16, wherein the respective drive means comprises a respective chain means (28, 29; and deflection sprockets are provided for each said chain means, mounted in each said bracket means (31, 32).

* * * * *